(12) United States Patent
Wada

(10) Patent No.: US 7,394,478 B2
(45) Date of Patent: Jul. 1, 2008

(54) EXPOSURE SYSTEM

(75) Inventor: Mitsugu Wada, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 156 days.

(21) Appl. No.: 10/957,675

(22) Filed: Oct. 5, 2004

(65) Prior Publication Data
US 2005/0078168 A1 Apr. 14, 2005

(30) Foreign Application Priority Data
Oct. 8, 2003 (JP) ............................. 2003/349425

(51) Int. Cl.
*B41J 2/45* (2006.01)
*B41J 2/47* (2006.01)

(52) U.S. Cl. ........................ 347/238; 347/232

(58) Field of Classification Search ......... 347/121–122, 347/130, 238–239, 255, 232–233, 240, 251–254
See application file for complete search history.

(56) References Cited

U.S. PATENT DOCUMENTS 6,147,697 A * 11/2000 Deguchi et al. ............. 347/238
6,624,839 B2 * 9/2003 Gaudiana et al. ............ 347/238
2001/0052926 A1 12/2001 Hori

* cited by examiner

*Primary Examiner*—Hai C Pham
(74) *Attorney, Agent, or Firm*—Sughrue Mion, PLLC

(57) ABSTRACT

An exposure system is provided with an exposure head formed of a red organic EL element which emits light in a red region and another organic EL element which emits light in a predetermined wavelength range shorter than the red region. The exposure system exposes a color photosensitive body containing therein at least a red silver-salt photosensitive material sensitive to the light in the red region and another silver-salt photosensitive material sensitive to the light in the predetermined wavelength range. An optical filter cuts the wavelength components which are shorter than the predetermined wavelength range and included in a sensitive range of the red silver-salt photosensitive material.

6 Claims, 3 Drawing Sheets

EXPOSURE SYSTEM

BACKGROUND OF THE INVENTION

1. Field of the Invention

This invention relates to an exposure system, and more particularly to an exposure system for exposing a color photosensitive material containing therein a silver-salt photosensitive material by the use of an organic EL element which emits color light.

2. Description of the Related Art

There has been known an exposure system where a photosensitive body is two-dimensionally exposed and an image is recorded on the photosensitive body by exposing the photosensitive body to light emitted from a light emitting element array comprising a plurality of light emitting elements arranged in the main scanning direction while the light emitting element array and the photosensitive body are moved relatively to each other. Recently, various exposure systems in which an organic EL (electroluminescence) element is employed as the light emitting element have been proposed.

Further, in U.S. patent Laid-Open No. 20010052926, there is disclosed an example of an exposure system where a photosensitive body formed of, e.g., a silver-salt photosensitive material is recorded with a full color image by the use of a red organic EL element, a green organic EL element and a blue organic EL element which respectively emit light in a red region, light in a green region and light in a blue region.

In the conventional exposure systems where organic EL elements are employed to expose the color photosensitive body, there has been a problem that it is apt to cause color mixing and deteriorates in color reproduction. The reasons will be described in detail, hereinbelow.

In FIG. 4, curve a shows sensitivity spectrum of a typical red silver-salt photosensitive material which produces cyan and curve b shows a light emitting spectrum of a typical blue organic EL element. As can be seen from the curve a, red silver-salt photosensitive materials generally have a sensitivity in a short wavelength region not longer than about 500 nm with a peak near 380 nm or so as well as a sensitivity in a red region with a peak about 700 nm. Whereas, the light emitting spectrum of a blue organic EL element which is now available has a skirt extending into the short wavelength side. Since the skirt of the light emitting spectrum largely overlaps with the sensitivity range not longer than about 500 nm of the red silver-salt photosensitive materials, the red silver-salt photosensitive materials easily sense light upon emission of light by a blue organic EL element.

SUMMARY OF THE INVENTION

In view of the foregoing observations and description, the primary object of the present invention is to provide an exposure system for exposing a photosensitive material containing therein a color silver-salt photosensitive material such as a silver halide photographic material to light emitted from an organic EL element, wherein color mixing generated when a red silver-salt photosensitive material senses light in color other than red is suppressed and the color reproduction is improved.

In accordance with the present invention, there is provided an exposure system which is provided with an exposure head formed of a red organic EL element which emits light in a red region and another organic EL element which emits light in a predetermined wavelength range shorter than the red region and exposes a color photosensitive body containing therein at least a red silver-salt photosensitive material sensitive to the light in the red region and another silver-salt photosensitive material sensitive to the light in the predetermined wavelength range, wherein the improvement comprises that an optical filter is provided to receive the light emitted from said another organic EL element and to cut the wavelength components which are shorter than the predetermined wavelength range and included in a sensitive range of the red silver-salt photosensitive material.

Said another organic EL element may be, for instance, a blue organic EL element which emits light in a blue region. In this case, as said optical filter, those which cut the wavelength components shorter than the blue region are employed. It is preferred that said optical filter is not higher than 30% in transmittance to light in a wavelength range of 360 to 420 nm.

It is preferred that said optical filter be fixedly provided on the exposure head. However, the optical filter may be disposed between the exposure head and the photosensitive body.

Further, it is preferred that a plurality of red organic EL elements and a plurality of said another organic EL elements are arranged in a main scanning direction to form a linear light emitting element array and a sub-scanning means which moves the exposure head and the color photosensitive body relatively to each other in a direction substantially perpendicular to the main scanning direction. The exposure system of the present invention may be arranged by the use of a surface light emitting element array comprising a plurality of such linear light emitting element arrays arranged in the sub-scanning direction.

In the exposure system of the present invention, by virtue of the optical filter which receives the light emitted from said another organic EL element which emits light in a predetermined wavelength range (e.g., a blue region) shorter than the predetermined wavelength range and cuts the wavelength components which are shorter than the predetermined wavelength range and included in the sensitive range of the red silver-salt photosensitive material, the overlapping of the wavelength components with the sensitivity range of the red silver-salt photosensitive material is suppressed, whereby color mixing generated when the red silver-salt photosensitive material senses light in color other than red is suppressed and a high color purity and a high color reproduction can be obtained.

Further, it has been known that the organic light emitting material employed in the organic EL elements generally deteriorates upon absorption of light shorter than its light emitting wavelength. The optical filter which cuts the wavelength components which are shorter than its light emitting wavelength (the predetermined wavelength range described above) cuts the wavelength components in the natural light or the room light which deteriorate the organic EL element and prevents them from being absorbed by the organic light emitting material employed in the organic EL elements, thereby preventing deterioration of the organic EL elements and increasing the service life thereof.

In the exposure system of the present invention, such an optical filter may be provided for organic EL elements other than the red organic EL element which require no special measures against the color mixing (e.g., a green organic EL element) an/or even for the red organic EL element in order to increase the service life thereof.

When a plurality of red organic EL elements and a plurality of said another organic EL elements form a linear light emitting element array or a surface light emitting element array, the optical filter can be relatively large in size corresponding to the size of the array and may be of an elongated or flat shape, whereby mounting of the optical filter on the exposure system is facilitated.

DESCRIPTION OF THE PREFERRED EMBODIMENT

Figure 1:
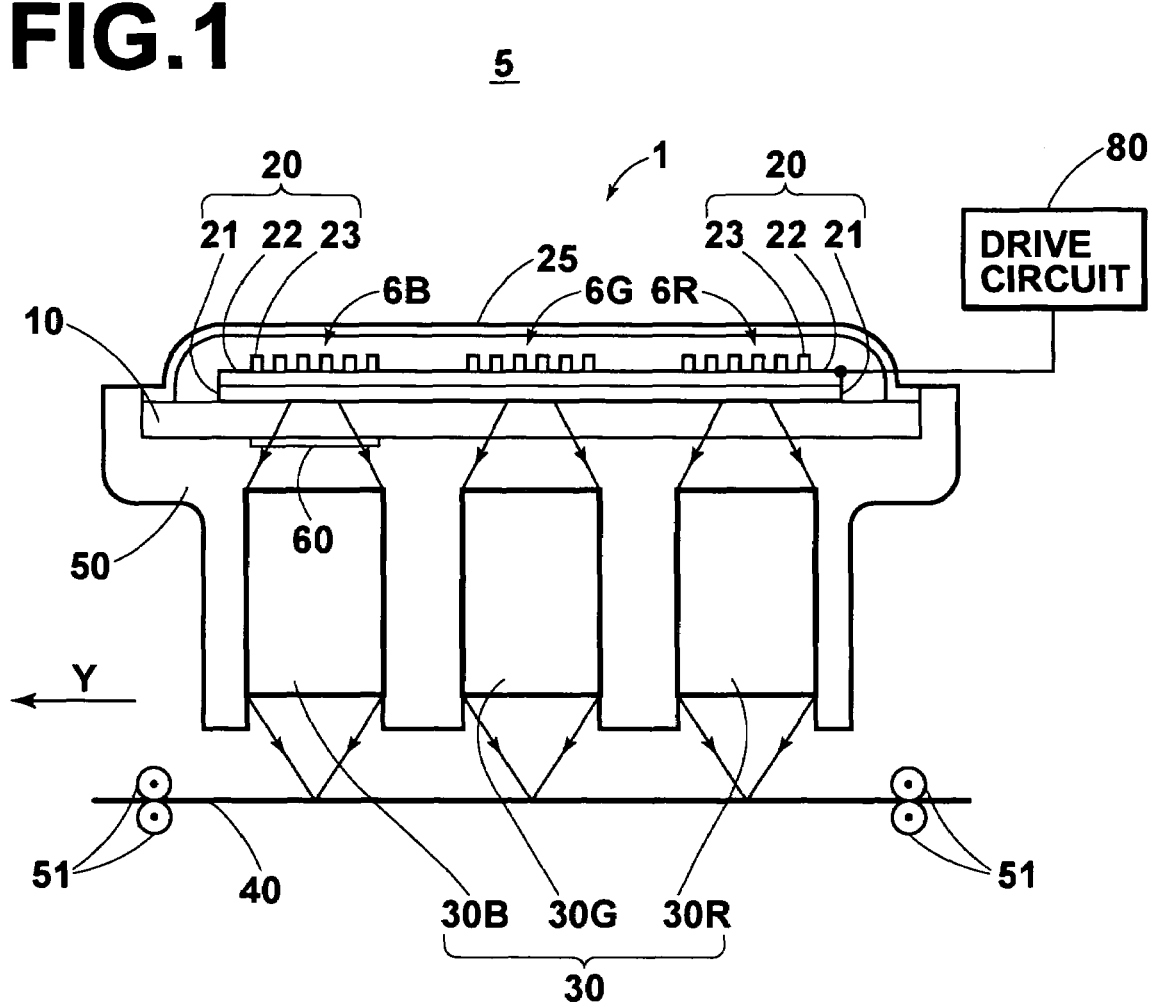
FIG. 1 is a side view of an exposure system in accordance with an embodiment of the present invention.

As shown in FIG. 1, an exposure system 5 in accordance with an embodiment of the present invention has an exposure head 1. The exposure head 1 comprises a transparent base 10, a number of organic EL elements 20 formed on the base 10 by deposition, a refractive index profile type lens array 30 (30R, 30G and 30B) which is a unit system for imaging on a color photosensitive sheet 40 an image generated by the light emitted from the organic EL elements 20, and a support 50 which supports the base 10 and the refractive index profile type lens array 30. An optical filter 60 which will be described in detail later is applied to the back side or the lower side of the base 10 to be opposed to the refractive index profile type lens array 30B.

The exposure system 5 further comprises, in addition to the exposure head 1, a sub-scanning means 51 in the form of, for instance, a pair of nip rollers which conveys the color photosensitive sheet 40 at a constant speed in a direction of arrow Y.

The organic EL elements 20 comprises a transparent base 10 such as of glass and an organic compound layer 22 and a metal cathode 23 formed in sequence by deposition on the transparent base 10. The organic compound layer 22 includes a transparent anode 21 and a light emitting layer and patterned for each pixel. The elements forming the organic EL elements 20 are arranged in a sealing member 25 which may be, for instance, a can of a stainless steel. That is, the base 10 is bonded to the edge of the sealing member 25 by adhesive and the sealing member 25 is filled with dry nitrogen gas. The organic EL elements 20 are sealed in the sealing member 25.

When a predetermined voltage is imparted between the transparent anode 21 and the metal cathode 23, the light emitting layer included in the organic compound layer 22 emits light, which is taken out through the transparent anode 21 and the transparent base 10. The organic EL element 20 is excellent in wavelength stability. The arrangement of the organic EL elements 20 will be described in detail later.

The transparent anode 21 is preferably not lower than 50% and more preferably not lower 70% in transmittance to visible light in the wavelength range of 400 nm to 700 nm, and may be of known material such as tin oxide, indium.tin oxide (ITO), indium.zinc oxide, and the like. Film of metal such gold, platinum or the like which is large in work function may be employed as the transparent anode. Further, the transparent anode may be of an organic compound such as polyaniline, polythiophene, polypyrrole or a derivative of these compounds. Transparent conductive films shown in "New development of transparent conductive material" supervised by Yutaka Sawada, CMC, 1999, may be applied to the present invention. Further, the transparent anode 21 may be formed on the base 10 by vacuum deposition, sputtering or ion plating.

The organic compound layer 22 may either be of a single layer of the light emitting layer or may be provided with, in addition to the light emitting layer, a hole injecting layer, a hole transfer layer, an electron injecting layer and/or an electron transfer layer, as desired. For example, the organic compound layer 22 and the electrodes may comprise an anode/a hole injecting layer/a hole transfer layer/a light emitting layer/an electron transfer layer/a cathode, an anode/a light emitting layer/an electron transfer layer/a cathode, or an anode/a hole transfer layer/a light emitting layer/an electron transfer layer/a cathode. Further, each of the light emitting layer, the hole transfer layer, the hole injecting layer and the electron injecting layer may be provided in a plurality of layers.

The metal cathode 23 is preferably formed of metal material which is small in work function, e.g., alkaline metal such as Li or K, or alkaline earth metal such as Mg or Ca, or alloy or mixture of these metals with Ag or Al. In order for the shelf stability and the electron-injectability at the cathode to be compatible with each other, the electrode formed of material described above may be coated with metal with is large in work function and high in conductivity, e.g., Ag, Al Au or the like. The cathode 23 may be formed by a known method such as vacuum deposition, sputtering or ion plating as the transparent anode 21.

Figure 2:
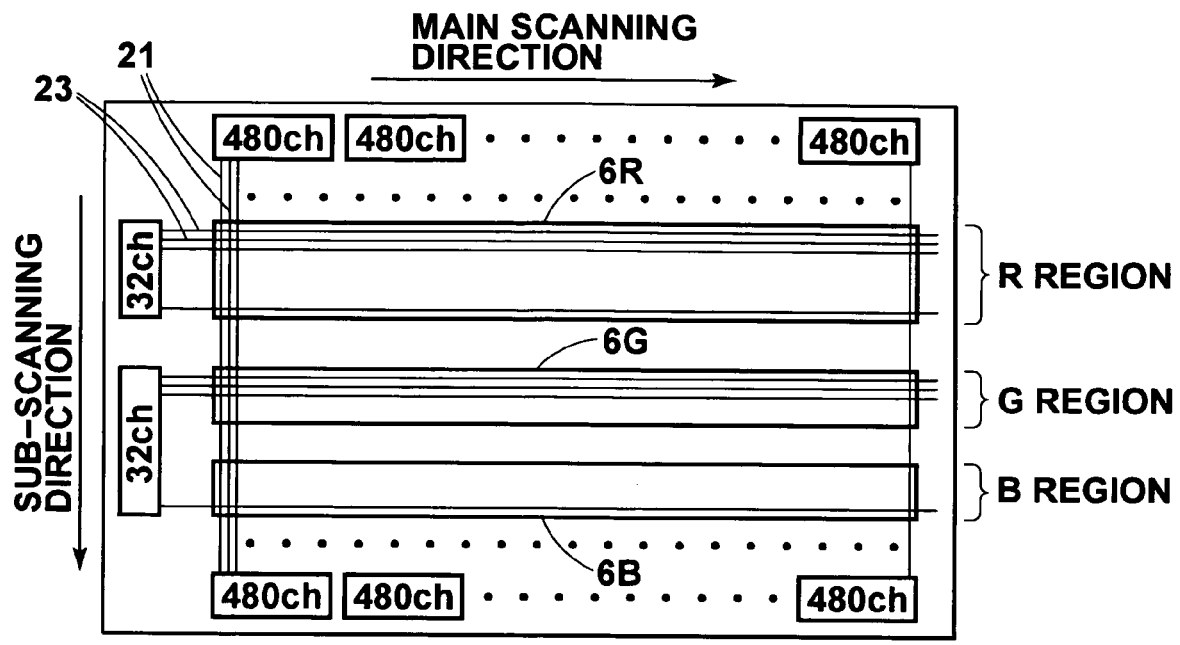
FIG. 2 is a schematic plan view of the exposure head of the exposure system.
Figure 3:
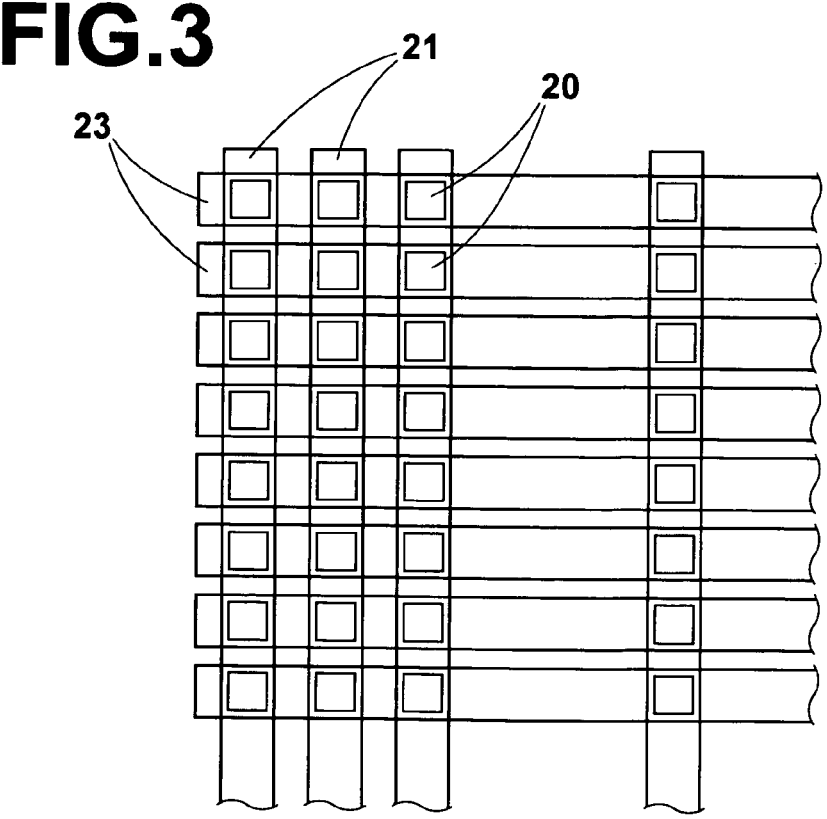
FIG. 3 is a plan view showing the arrangement of the electrodes in the exposure head.

Arrangement of the organic EL elements 20 will be described in detail, hereinbelow. FIG. 2 is a view showing the arrangement of the transparent anodes 21 and the metal cathodes 23 in the exposure head 1 and FIG. 3 is a view showing the arrangement in an enlarged scale. As shown in FIGS. 2 and 3, each of the transparent anodes 21 is patterned into a predetermined shape extending substantially in the sub-scanning direction and common to the organic EL elements 21 arranged in this direction. In this particular embodiment, 3840 (=480×8) of the transparent anodes 21 are arranged in the main scanning direction. Each of the metal cathodes 23 linearly extends in the main scanning direction and common to the organic EL elements 21 arranged in this direction. In this particular embodiment, 64 of the transparent anodes 21 are arranged in the sub-scanning direction.

The transparent anodes 21 and the metal cathodes 23 form column electrodes and row electrodes and a predetermined voltage is imparted by a drive circuit 80 between one or more of the transparent anode 21 and one or more of the metal cathode 23 selected according to the image signal. When a voltage is imparted between one of the transparent anode 21 and one of the metal cathode 23, the organic compound layer 22 disposed at the intersection of the transparent anode 21 and the metal cathode 23 applied with the voltage emits light and the light is taken out through the transparent base 10. That is, in this embodiment, one organic EL element 20 is formed at each of the intersections of the transparent anode 21 and the metal cathode 23 and a plurality of organic EL elements are arranged in the main scanning direction at predetermined pitches to form a linear light emitting element array with a plurality of the linear light emitting element arrays are arranged in the sub-scanning direction to form a surface light emitting element array.

As can be understood from the description above, a so-called passive matrix drive system is employed in this embodiment. Since the passive matrix drive system is known, it will not be described in detail, here. It is possible to employ an active matrix drive system in which a switching element such as a TFT (Thin Film Transistor) is employed. The exposure system 5 of this embodiment is adapted to exposure of a full color image to a silver-salt color photosensitive sheet such as a halogenated silver color photosensitive sheet 40. The arrangement for this purpose will be described in detail, hereinbelow.

The organic EL elements 20 comprises those emitting red light, green light and blue light according to the light emitting layer included in the organic compound layer 22. In order to separate the organic EL elements according to the color of light emitted from the organic EL elements, those emitting red light, green light and blue light are sometimes referred to as "the organic EL element 20R", "the organic EL element 20G", and "the organic EL element 20B", respectively, hereinbelow.

The organic EL elements 20R are disposed in R area in FIG. 2. 3840 organic EL elements 20R are arranged in the main scanning direction to form one linear red light emitting element array and 32 linear red light emitting element arrays form a surface red light emitting element array 6R. The organic EL elements 20G are disposed in G area in FIG. 2. 3840 organic EL elements 20G are arranged in the main scanning direction to form one linear green light emitting element array and 32 linear green light emitting element arrays form a surface green light emitting element array 6G. The organic EL elements 20B are disposed in B area in FIG. 2. 3840 organic EL elements 20B are arranged in the main scanning direction to form one linear blue light emitting element array and 32 linear blue light emitting element arrays form a surface blue light emitting element array 6B.

However, in FIG. 1, only six linear light emitting element arrays are shown to form each surface light emitting element array for the purpose of simplicity.

In the exposure system 5 shown in FIG. 1, when the color photosensitive sheet 40 is to be image-wise exposed, the surface red light emitting element array 6R, the surface green light emitting element array 6G, and the surface blue light emitting element array 6B of the exposure head 1 are selectively driven by the drive circuit 80 according respectively to red image data, green image data, and blue image data while the sub-scanning means 51 conveys the color photosensitive sheet 40 in the sub-scanning direction shown by arrow Y at a constant speed.

At this time, an image by red light from the 32 linear light emitting element arrays 6R, an image by green light from the 16 linear light emitting element arrays 6G, and an image by blue light from the 16 linear light emitting element arrays 6B are respectively imaged on the color photosensitive sheet 40 in a unit magnification by the refractive index profile type lens arrays 30R, 30G and 30B. With this, the areas exposed to the red light from the 32 linear light emitting element arrays 6R are then exposed to the green light from the 16 linear light emitting element arrays 6G and then exposed to the blue light from the 16 linear light emitting element arrays 6B. The full color main scanning lines each thus formed are arranged side by side in the sub-scanning direction, whereby the color photosensitive sheet 40 is recorded with a two-dimensional full color image.

The surface red light emitting element array 6R, the surface green light emitting element array 6G, and the surface blue light emitting element array 6B are driven to emit light in a pulse-like fashion, and for instance, by controlling the pulse width, gradation can be generated for each pixel and the color photosensitive sheet 40 can be recorded with a continuous gradation image. Further, a part of the color photosensitive sheet 40 undergoes exposure to red light 32 times by the surface red light emitting element array 6R, to green light 16 times by the surface green light emitting element array 6G, and to blue light 16 times by the surface blue light emitting element array 6B and undergoes multiple exposure to light, 64 times in total, whereby a large dynamic range of exposure can be ensured and an image of high gradation can be recorded.

The refractive index profile type lens array 30 may comprise SELFOC lenses each opposed to one organic EL element 20.

The optical filter 60 will be described next. As shown in FIG. 1, the optical filter 60 is disposed to receive the light from the surface blue light emitting element array 6B and the light emitted from the surface blue light emitting element array 6B is projected through the color photosensitive sheet 40, The transmitting character is shown by curve c in FIG. 4. The sensitivity spectrum of the red silver-salt photosensitive material employed in the color photosensitive sheet 40 and the light emitting spectrum of the blue organic EL element 20B are also shown in FIG. 4 (curves a and b, respectively).

Figure 4:
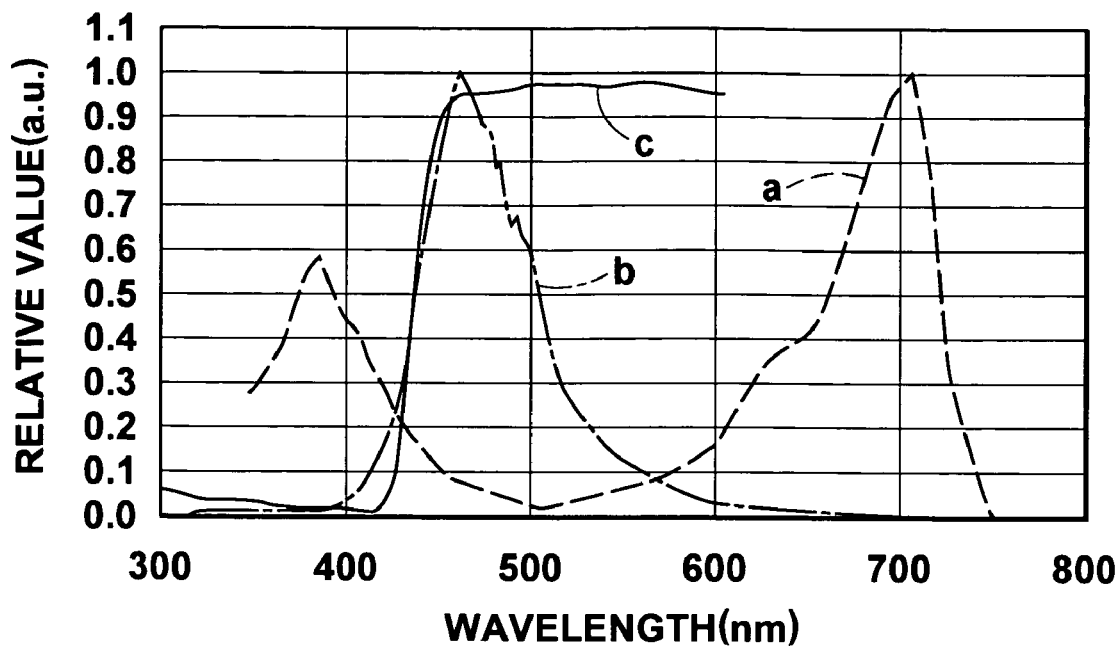
FIG. 4 is a graph showing the transmittivity of the optical filter employed in the exposure system, the sensitivity spectrum of the red silver-salt photosensitive material, and the light emitting spectrum of the blue organic EL element.

As can be seen from FIG. 4, the red silver-salt photosensitive material has a sensitivity in a short wavelength region not longer than about 500 nm with a peak near 380 nm or so as well as a sensitivity in a red region with a peak about 700 nm and has a skirt extending into the short wavelength side. Since the skirt of the light emitting spectrum largely overlaps with the sensitivity range not longer than about 500 nm of the red silver-salt photosensitive material, the color photosensitive sheet 40 easily senses if the light from the blue organic EL element 20B is projected onto the color photosensitive sheet 40 as it is.

The optical filter 60 cuts the major part of the wavelength components of the light emitted from the blue organic EL element 20B which are shorter than the blue region and included in the sensitive range of the red silver-salt photosensitive material, whereby since the wavelength components less overlaps with the sensitivity range of the red silver-salt photosensitive material, the color mixing generated when the red silver-salt photosensitive material senses light from the blue organic EL element 20B is suppressed and a high color purity and a high color reproduction can be obtained.

Figure 5:
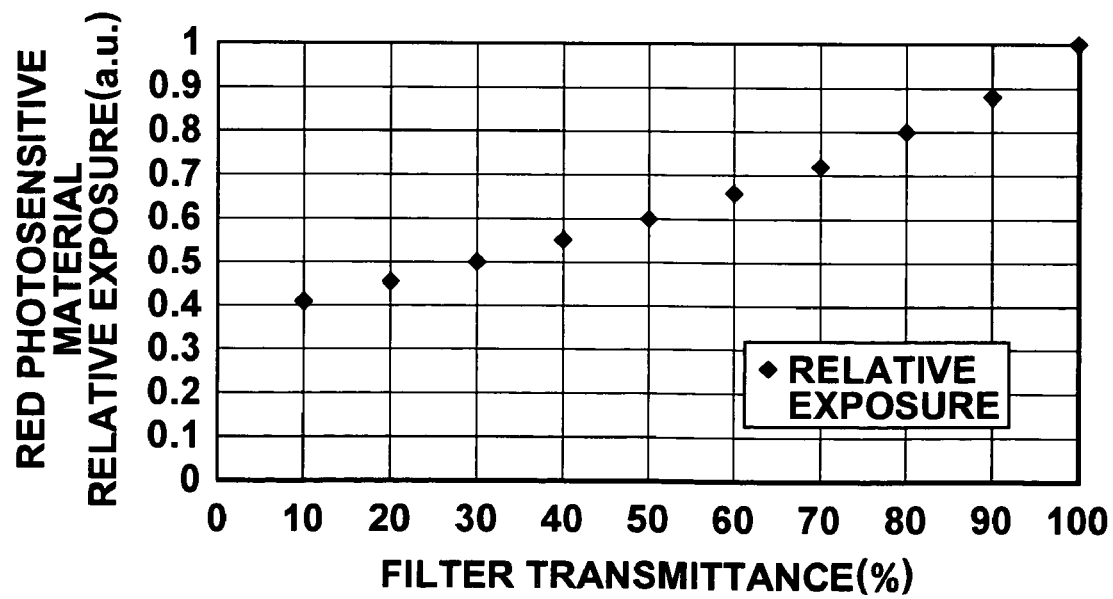
FIG. 5 is a graph showing the relation between the transmittance of the optical filter and the exposure of the red silver-salt photosensitive material.

FIG. 5 shows the change of the relative exposure of the red silver-salt photosensitive material when nine optical filters whose transmittances to light of a wavelength in the range of 360 to 420 nm were different from each other by 10%, that is, were 10%, 20% . . . 90%, were mounted on the blue organic EL element 20B with the blue organic EL element 20B operated to emit light in a constant amount. In FIG. 5, transmittance 100% corresponds to the case without an optical filter, and the relative exposure of the red silver-salt photosensitive material is shown with the exposure without an optical filter taken as 1.

As can be seen from FIG. 5, the exposure of the red silver-salt photosensitive material can be reduced as the transmittance to light in the wavelength range of 360 to 420 nm of the optical filter 60 is lowered. It is necessary for the transmittance to be not larger than 30% to reduce the exposure of the red silver-salt photosensitive material to not larger than a half of the case where no optical filter is provided.

Though the optical filter 60 is applied to the transparent base 10 of the exposure head 1 and integrated therewith in this embodiment, the optical filter 60 may be disposed between the exposure head 1 and the color photosensitive sheet 40.

Though the optical filter 60 is disposed so that the light emitted from the blue organic EL element 20B impinges upon the optical filter 60 in this embodiment, in the case where the light emitting spectrum of the green organic EL element 20G has a skirt extending into the short wavelength side, the green organic EL element 20G may be provided with an optical filter to cut the components in the skirt.

Further, though a large area optical filter 60 is employed in this embodiment since a surface blue organic EL element array 6B is employed, an elongated optical filter may be employed when a linear light emitting element array is employed. Further, the present invention may also be applied to an exposure system where a light beam emitted from an organic EL element is one-dimensionally or two-dimensionally deflected to scan a color photosensitive body.

What is claimed is:

1. An exposure system which is provided with an exposure head formed of a red organic EL element which emits light in a red region and another organic EL element which emits light in a predetermined wavelength range shorter than the red region and exposes a color photosensitive body containing therein at least a red silver-salt photosensitive material sensitive to the light in the red region and another silver-salt photosensitive material sensitive to the light in the predetermined wavelength range, wherein the improvement comprises that
an optical filter is provided to receive the light emitted from said another organic EL element and to cut the wavelength components which are shorter than the predetermined wavelength range and included in a sensitive range of the red silver-salt photosensitive material,
wherein the optical filter has a high pass filter characteristic,
wherein said another organic EL element is a blue organic EL element which emits light in a blue region and said optical filter cuts the wavelength components shorter than the blue region.

2. An exposure system as defined in claim 1 in which said optical filter is not higher than 30% in transmittance to light in a wavelength range of 360 to 420 nm.

3. An exposure system as defined in claim 1 in which said optical filter is fixedly provided on the exposure head.

4. An exposure system as defined in claim 1 in which a plurality of said red organic EL elements and a plurality of said another organic EL elements are arranged in a main scanning direction to form a linear light emitting element array and a sub-scanning means which moves the exposure head and the color photosensitive body relatively to each other in a direction substantially perpendicular to the main scanning direction.

5. The exposure system of claim 1, wherein the optical filter is disposed only between the blue organic EL element and the color photosensitive body and no filter is disposed between the red organic EL element and the color photosensitive body.

6. The exposure system of claim 1, wherein the sensitivity range of the red silver-salt photosensitive material comprises a first portion in the red region and a second portion comprising the wavelength components shorter than the predetermined wavelength range, wherein intensity values of the first portion dominate intensity values of the second portion.

* * * * *